Sept. 4, 1951 W. DE BACK 2,567,103
SLUDGE AND CONDENSATE DISCHARGE FOR STEAM PEELERS
Filed Jan. 6, 1949 2 Sheets-Sheet 1
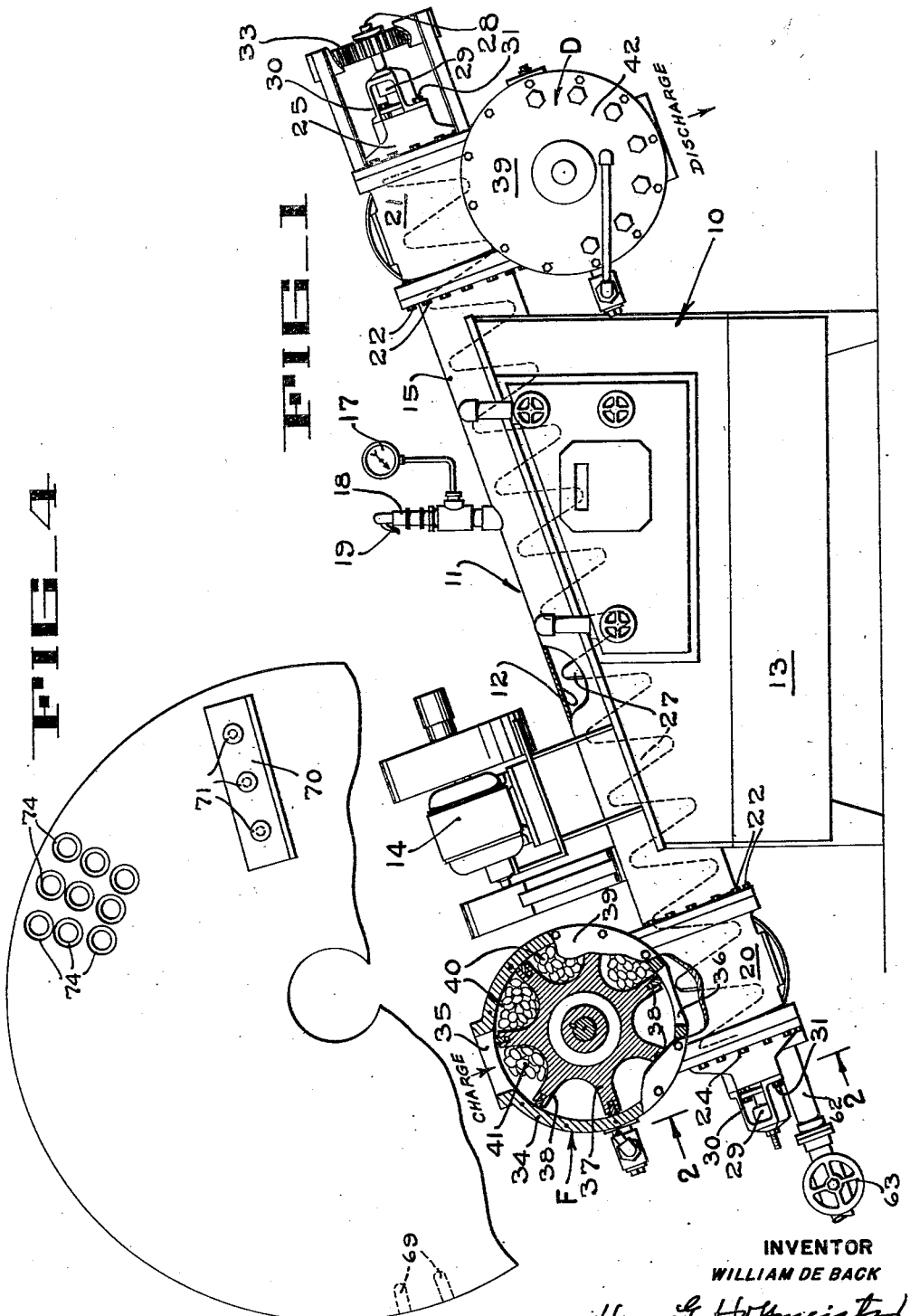
INVENTOR
WILLIAM DE BACK
BY Hans G. Hoffmeister
ATTORNEY

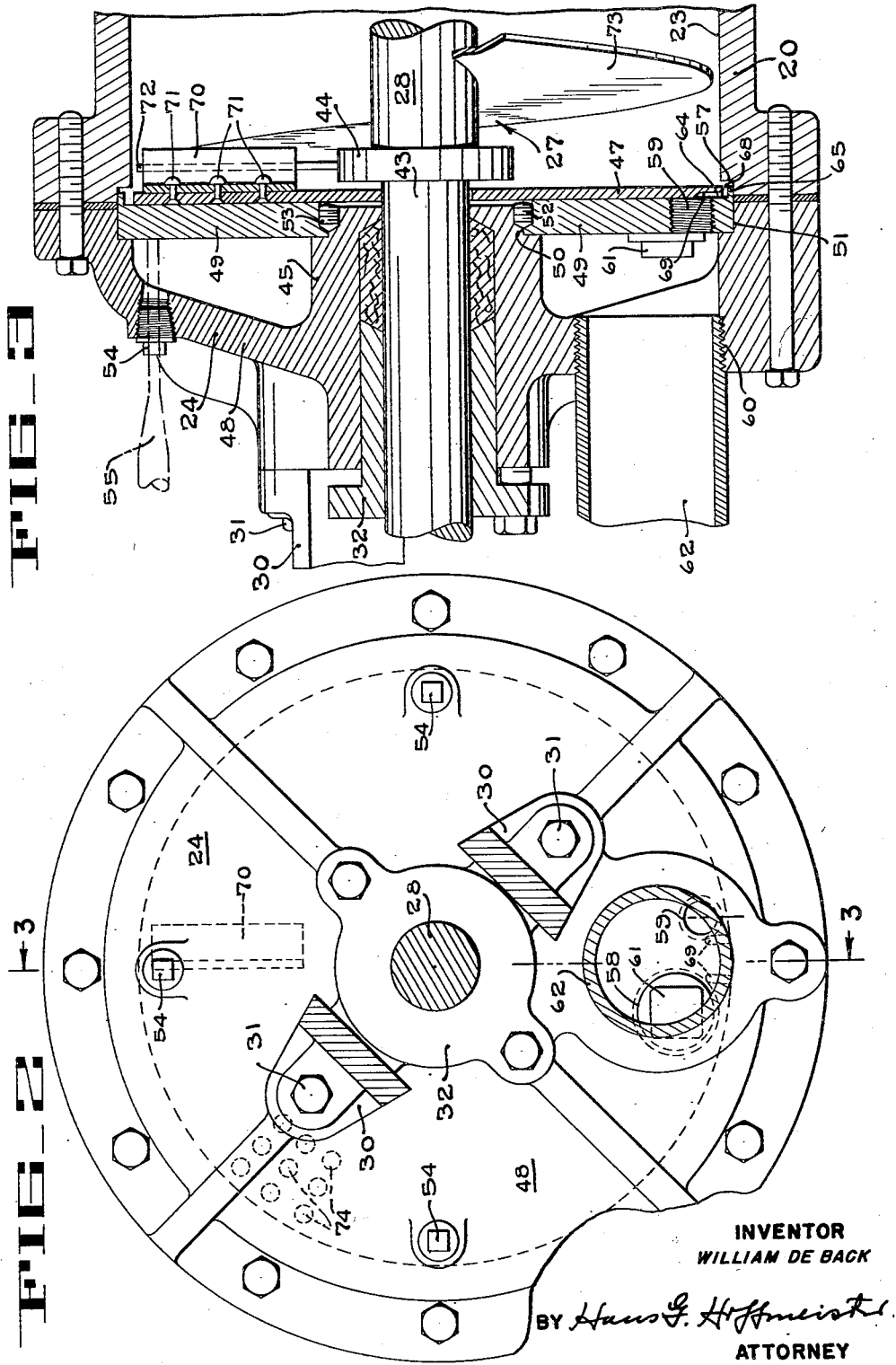

Patented Sept. 4, 1951

2,567,103

UNITED STATES PATENT OFFICE 2,567,103

SLUDGE AND CONDENSATE DISCHARGE FOR STEAM PEELERS

William de Back, San Jose, Calif., assignor to Food Machinery and Chemical Corporation, San Jose, Calif., a corporation of Delaware Application January 6, 1949, Serial No. 69,434

9 Claims. (Cl. 146—47)

The present invention appertains to a continuous steam peeler for peeling fruit and vegetables, and relates more particularly to an automatic blow-off device for removing sludge and condensate from the same.

The present invention is intended for use with a peeler of the type wherein unpeeled fruit or vegetables, such as potatoes, are inserted through a steam tight rotary feeder into the lower end of an inclined cylindrical steam chamber. A spiral conveyor is mounted coaxially of the chamber, and is power driven to rotate about its axis and convey the vegetables toward the upper end of the chamber where a steam tight discharge is provided to remove the peeled vegetables from the chamber without loss of steam pressure in the chamber.

As the fruit or vegetables are thus fed into, advanced upwardly through, and discharged from the steam chamber, they rub against each other, the conveyor flight, and the walls of the chamber, so that besides the condensate large quantities of skin of the treated products, as well as foreign matter introduced with the same, accumulate in the lower part of the chamber and form a sludge or sediment, which is undesirable and interferes with the efficient operation of the machine. The accumulation of sediment is especially aggravated when the fruit or vegetables are sprayed with water during their processing in the treating chamber.

To discharge the condensate and to remove this sediment or sludge from the treating chamber it has heretofore been the practice to provide the chamber with an ordinary sludge vent which could be opened to the atmosphere from a low point in the chamber, with a valve, such as an ordinary globe or gate valve, mounted to control the flow therefrom. This valve was opened from time to time to blow the sludge and condensate from the chamber. However, the valve operation was uncertain, and required excessive maintenance under the severe operating conditions of high temperature and pressure and the abrasive and clogging action of the materials contained in the sludge. This resulted in severe sludging up of the chamber and abrasion of the internal parts of the mechanism, which required excessive maintenance and tended to detract materially from the otherwise excellent operating characteristics of this type of peeler.

It is, therefore, an object of the present invention to provide an improved automatic sludge and condensate discharge for continuous steam peeling machines.

Another object is to provide a sludge and condensate remover for a steam pressure vegetable peeler, which includes a rotary element adapted to agitate and remove sludge and condensate from a low point of the treating chamber of the peeler.

Another object is to seat a rotatably mounted sealing element in the low end of an inclined treating chamber of a steam pressure vegetable peeler, the sealing element being arranged to effect periodic sludging of the chamber from a low point thereof to a discharge point located exteriorly of the chamber.

Another object is to mount a pressure sealing element for normally free rotative and limited angular adjusting movement on the shaft of a screw conveyor rotatably and coaxially mounted within a cylindrical treating chamber, and to drive the element by means operatively connecting the plate to a spiral flight of the conveyor without restricting the plate against free angular adjusting movement.

These and other objects and advantages of the invention will become apparent from the following description and the accompanying drawings, wherein:

Fig. 1 is a somewhat diagrammatic side elevation of an inclined, continuous pressure steam peeler provided with the sludge and condensate remover of the present invention, certain parts being broken away while others are shown in section.

Fig. 2 is an enlarged fragmentary transverse sectional view taken along line 2—2 of Fig. 1.

Fig. 3 is a fragmentary longitudinal vertical sectional view taken along line 3—3 of Fig. 2.

Fig. 4 is a fragmentary elevational view showing the inner face of the pressure sealing, and sludge and condensate remover plate, forming part of the present invention.

Referring to the mechanism shown in Fig. 1, the inclined steam peeling mechanism 10 comprises a steam or treating chamber 11 with a uniform cylindrical bore 12 therein mounted with the axis of the bore disposed at an inclined angle of approximately 20° from the horizontal. The steam chamber is supported on a base 13 of conventional construction.

A drive motor 14 is mounted on the central cylindrical body portion 15 of the steam chamber. The motor 14 is connected through suitable drive mechanism to drive the various mechanisms to be described later herein. The steam chamber 11 is provided with a usual pressure gauge 17, safety valve 18, and manual pressure release valve 19.

A pair of end members 20 and 21 are mounted one on each end of the central body portion 15. The end members may be of cast or welded construction, and are secured to the central body portion as by cap screws 22. The steam chamber end members 20 and 21 are similar to each other, but are mounted in relatively inverted positions. Each of the end members has a bore portion 23 (Fig. 3) which is coextensive with the cylindrical bore 12 of the central body portion 15.

The outer ends of the end members 20 and 21 (Fig. 1) are closed by end closure members or heads 24 and 25, respectively. These heads also may be of cast or welded construction. The head 25 on the upper end of the steam chamber may be of any suitable construction, but the lower head 24 has distinction features which will be brought out later herein.

A spiral or screw conveyor 27 has an axial shaft 28 which is mounted for rotation in bearings 29 supported in yokes 30 mounted by bolts 31 to extend outwardly from the heads 24 and 25, respectively. The bearings 29 may be thrust type roller bearings.

The conveyor shaft is sealed to the heads against stem loss by usual packing glands 32 (Fig. 3). A drive gear 33 (Fig. 1) is keyed to the projecting upper end of the conveyor shaft and is driven by conventional drive mechanism (not shown) from the motor 14. A rotary feed valve F and discharge valve D are associated with the chamber end members 20 and 21, respectively. These valves are of similar construction and only the lower one, shown in detail in Fig. 1, will be described.

The feed valve F comprises an annular rotor or valve chamber 34 formed integrally with, and extending upwardly of, the lower end member 20. This rotor chamber is provided with an inlet opening 35, which is open to the atmosphere, and an outlet opening 36 which establishes communication between the housing 34 and the bore 23 of the end member 20.

A pocketed article feeding rotor or valve 37 is rotatably mounted in the chamber 34 with blades 38 thereof in sealing engagement with the peripheral wall of the rotor chamber. Rotor chamber side plates 39 are mounted in sealing engagement with the rotor 37, one plate being mounted on each side of the rotor chamber 34. The feed rotor 37 is driven by the motor 14 in any convenient manner, and in synchronism with the other parts of the mechanism. The spaces between the rotor blades thus form individually sealed pockets 40 for transferring articles, such as fruit or vegetables to be peeled, from the atmosphere into the steam chamber without loss of steam pressure.

The food products 41 to be peeled are fed by suitable accessory equipment, not shown, into the inlet opening 35 in quantities sufficient to fill each of the pockets or compartments 40 to approximately 70 per cent of its capacity. A similar but inverted arrangement is provided by the discharge valve D associated with the upper end member 21 to discharge the peeled articles from the steam chamber.

Referring now to the automatic sludge and condensate remover which is a principal feature of the present invention, the lower end portion of the axial conveyor shaft 28 (Fig. 3) is reduced, as shown at 43, and a collar 44 is fitted onto the reduced end portion of the shaft. This collar is spaced inwardly from the inner end of a hub portion 45 of the lower head 24, in which the packing gland 32 is mounted, by a distance substantially greater than the thickness of a rotary sealing plate 47. This sealing plate is mounted loosely on the reduced shaft portion 43 to be free for limited tilting movement relatively thereto.

The lower head 24 has a bell-shaped central portion 48. A relatively thick, flat, annular backing plate 49 of suitable material, such as metal, is mounted in a seat formed by rabbeted grooves 50 and 51 formed in the hub 45 and an inner marginal edge of the bell-shaped portion 48, respectively. A pair of set screws 52 and 53 are screwed into threaded holes drilled half in the hub and half in the backing plate to anchor the backing plate against rotation.

A plurality of plugs 54 are screwed into threaded holes in the bell-shaped portion of the lower head 24. These plugs are removable to admit the insertion of a common drift pin 55, indicated in dot-dash lines in Fig. 3, when it is desired to remove the backing plate 49 upon disassembly of the apparatus.

The diameter of the backing plate 49, and, therefore, the diameter of its marginal seat 51 in the head bell portion 48, is slightly greater than that of the steam chamber bore 12. A shallow rabbeted groove 57, therefore, also is provided marginally around the end of the corresponding bore 23 in the end member 20. This arrangement retains the backing plate against substantial axial displacement except by removing the lower head 24.

The backing plate has a large threaded remover opening 58 (Fig. 2) and a small threaded remover opening 59 therethrough near the lower marginal edge thereof, when mounted, as illustrated in Figs. 2 and 3. These openings are located axially inwardly from a threaded opening 60 in the bell-shaped portion 48 of the lower head 24. The diameters of the openings 58 and 59 are a matter of design, and may be computed readily by one familiar with the art upon reading the description of their operation and functions as set forth herein.

The opening 60 in the lower head 24 is substantially larger in diameter than either of the openings 58 or 59. The clearance of the bell-shaped portion 48 from the backing plate 49 is sufficient to admit the threaded insertion of either a theaded plug 61 to close the larger opening 58, or a similar type smaller plug, not shown, to close the smaller opening 59. Thus, either of the openings 58 or 59 can be closed selectively as required before screwing a sludge and condensate remover pipe 62 into the threaded opening 60 in the lower head. A manual control valve 63 is mounted to control fluid flow through the pipe 62. During normal operation of the apparatus, however, this valve is left open.

The inner face of the backing plate 49 has a circular recessed seat 64 therein, surrounded by an annular marginal rim 65. The rotatively mounted sealing plate 47 is seated on the recessed seat 64 on the backing plate to have sealing engagement therewith, and overlies the plug receiving openings 58 and 59. The sealing plate 47 is of sufficiently smaller diameter than the seating recess 64 to provide a substantial marginal clearance 68 between the periphery of the sealing plate and the rim 65 surrounding the recess.

The plug receiving holes 58 and 59 are located with their outer marginal walls both at the same radial distance from the axis of the conveyor 27.

One or more radially disposed grooves 69 (Fig. 3) are formed in the rear or sealing face of the sealing plate 47. These grooves extend from the periphery of the sealing plate to a point radially inwardly from the outer edges of both the plug receiving holes 58 and 59. They thus provide passages opening from a low zone of the steam chamber into the plug receiving holes upon each full rotation of the sealing plate.

The loosely mounted rotative sealing plate 47 has an angle bracket 70 secured to the inner face thereof as by rivets 71. The bracket is mounted substantially radially of, and with its outer end near the periphery of the sealing plate. The rivets preferably are of softer material than either the backing plate or the sealing plate, and their heads toward the backing plate are countersunk to retain the seal between the sealing plate and the backing plate. The angle bracket 70 is positioned to be engaged by the radially disposed lower end 72 of the spiral flight 73 of the screw conveyor. Thus, as the conveyor is rotated by the motor 14 to move material upwardly along the steam chamber 11, by a usual drive mechanism including the drive gear 33, the loosely mounted sealing plate 47 also will be rotated by the engagement between the end 72 of the flight 73 and the angle bracket 70.

Rotation of the sealing plate causes the outer end of the bracket 70 to swing adjacent the wall of the bore 23 of the lower end member 20 and thus tends to stir up any sludge and condensate in the bottom of the steam chamber at each revolution of the sealing plate. This prevents the sludge from caking and keeps it in condition for easy removal.

A group of remover holes 74 are drilled in an area of the sealing plate to pass over and open into the larger plug receiving hole 58 upon each revolution of the sealing plate. Some of these holes also are positioned to open into the smaller plug receiving hole 59 during each such revolution. These holes in the sealing plate preferably are relatively small as compared to the larger plug-receiving hole 58 to prevent any large pieces of the products undergoing treatment from being blown out of the cylinder with the sludge and condensate.

When the steam peeler 10 is to be used in conjunction with a water spray of the usual type of washing away peelings and other matter removed during processing, the larger plug 58 will be removed, and the smaller hole 59 will be plugged. When the device is to be used with steam alone, however, the larger hole 58 will be plugged, as shown in Fig. 2, and the smaller hole 59 will be left open.

*Operation*

Before operating the peeler, the decision must be made whether or not a water spray wash will be used and the plugs adjusted as set forth in the preceding paragraph. When a change in the plug arrangement is to be made, the pipe 62 must be removed to provide access to the plugs. The changing of plugs is necessary only at infrequent intervals, for example, when changing from one type of fruit or vegetable to another. With the selected plug arrangement made and the manually-operated valve 63 open, the motor 14 is energized, steam is admitted to the chamber 11, and the pressure is brought to a required reading on the gauge 17.

The food products to be peeled, for example, potatoes, are fed into the inlet 35 preferably in batches adapted to fill each compartment 40 of the rotary feed valve to a degree where the products will not be damaged or sheared off by the rotative action of the valve. As each successive pocket load of the food products drops by gravity through the lower opening 36 in the rotary housing 34, the products are exposed to the steam and drop to the bottom of the inclined steam chamber 10. Here the conveyor 27 propels the articles upwardly along the inclined bottom of the steam chamber toward its upper end, rolling them about and exposing all portions thereof to the heat of the steam chamber. They then are discharged through the upper end assembly 42 in a manner generally similar to that described for the feed valve. The rate of discharge conforms generally with that of charging.

As the screw conveyor 27 is rotated by the motor through the gear 33 and associated mechanism (not shown), it rotates the loosely mounted sealing plate 47 which is urged toward the backing plate 49 by the unbalance between steam pressure in the chamber 11 and atmospheric pressure beyond the unplugged hole 58 or 59, as the case may be. The manually controlled valve 63 in the remover pipe 62 being open, the interior of the bell housing portion 48 of the lower head 24 beyond the backing plate will be open to the atmosphere.

As the radial grooves 69 are swung into register successively with the unplugged hole 58 or 59 in the backing plate, as the case may be, the unbalance of pressure between the interior of the steam chamber and the atmospheric pressure beyond the unplugged hole blows sludge or condensate from the very lowermost zone of the steam chamber upwardly through the passages provided by the grooves 69 and outwardly through the unplugged hole. Also, on each revolution of the sealing plate 47, as the holes 74 therein register with the unplugged hole in the backing plate, accumulated condensate and sludge will be blown out through the unplugged hole in a manner similar to that described for the grooves.

Since this cleaning action occurs upon each revolution of the sealing plate 47, and since the stirring action of the angle bracket prevents caking of sludge, the steam chamber thus is kept free from accretions of foreign matter and peelings which hitherto have been a source of trouble and annoyance with this type of mechanism.

Due to the high temperatures to which the sealing plate and backing plate are exposed, and the fact that no grease or other lubricant which might contaminate the food products being processed can be employed to reduce friction between these plates, the backing plate 49 preferably is made of bronze and the rotary sealing plate 67 of stainless steel.

The only effective pressure area on the sealing plate will be over areas thereof where the pressure on the outer face thereof is reduced by connection to the atmosphere through the unplugged hole 58 or 59. Therefore, this effective pressure will act principally on the lower portion of the sealing plate and will tend to concentrate the wear between the sealing plate and the backing plate on the lower portion of the backing plate. Since the sealing plate is rotated constantly during operation of the apparatus, wear on the sealing plate will be distributed but will be greater toward its outer margin. However, the relatively loose mounting of the sealing plate on the conveyor shaft permits it to tilt relatively to the axis of the conveyor and thus continues to maintain itself and the backing plate in sealing contact with each other even after a considerable amount of wear has occurred between these plates.

The device comprises a simple, fully automatic, arrangement for keeping the peeling chamber clean and free from sludge and condensate with a minimum loss of steam. It requires no expensive accessory drive mechanism and the sealing parts automatically tend to keep themselves seated even after the occurrence of a substantial amount of wear. Since such wear as does occur is between inexpensive and readily replaceable parts, maintenance cost is negligible. When necessary, it usually need be performed only at the usual inspection and overhaul before each canning season.

While I have illustrated and described a preferred embodiment of my invention, it will be understood by those familiar with the art that the arrangement is capable of some modification without departing from the spirit of the present invention and the scope of the appended claims.

Having thus described my invention, what I claim as new and desire to protect by Letters Patent is:

1. A sludge and condensate discharge for a steam peeler having an axially inclined cylindrical steam pressure chamber with a power driven rotary element mounted therein, power drive means operatively connected to rotate said rotary element, and means for introducing products into and removing them from said steam chamber, said chamber having an exteriorly discharging opening below a maximum desired sludge level therein; said discharge comprising a rotative sealing plate adapted to be mounted coaxially of said power driven rotary element to be forced into sealing condition over said discharge opening by pressure within the steam chamber, and drive means operatively interconnecting said power driven rotary element and said sealing plate, said sealing plate having a hole therein at a radial distance from the rotative axis of the sealing plate to open into said discharging opening upon each complete rotation of the sealing plate.

2. A sludge and condensate remover for a steam peeler having an axially inclined cylindrical steam pressure chamber with a power driven rotary conveyor mounted coaxially therein, power drive means operatively connected to rotate said rotary conveyor and means for introducing articles into and removing them from said steam chamber, said chamber having a pair of different sized exteriorly discharging openings below a maximum desired sludge level therein; said remover comprising a rotative sealing plate adapted to be mounted loosely coaxially of said conveyor to be forced into sealing condition over said discharge opening by pressure within the steam chamber, and drive means interconnecting said conveyor and said sealing plate, said sealing plate having a plurality of holes therein, each of said holes being smaller than either of said exteriorly discharging openings, the holes being located at different radial distances from the rotative axis of the sealing plate to open into one of said discharging openings upon each complete rotation of the sealing plate, some of said holes being within, and some being wholly beyond the radial limits of the other of said discharge openings.

3. A sludge and condensate remover for a steam peeler having an axially inclined cylindrical steam pressure chamber with a power driven rotary conveyor mounted coaxially therein, power drive means operatively connected to rotate said conveyor, and means for introducing articles into and removing them from said steam chamber; said remover comprising a backing plate adapted to be seated removably in a lower end portion of such cylindrical chamber to have a portion thereof located below a maximum desired sludge level in said chamber, said backing plate having two different sized exteriorly discharging openings therein with their outer marginal walls located below such maximum sludge level and substantially equi-distant from the rotative axis of the conveyor, means for closing, selectively, one or the other of said openings, a rotative sealing plate mounted loosely coaxially of said power drive rotary element to overlie said openings in the backing plate, and adapted to be forced by steam pressure within the chamber into sealing relation with the backing plate, and drive means interconnecting said power driven rotary element and said sealing plate, said sealing plate having a grouped plurality of holes therein, each of said grouped holes being smaller than the larger of said exteriorly discharging openings in the backing plate, the holes being grouped between radial distances from the rotative axis of the sealing plate to open into the larger of said discharging openings upon each complete rotation of the sealing plate, some of the grouped holes being within, and some being wholly beyond the radial limits of the smaller of said discharge openings.

4. A sludge and condensate remover for a steam peeler comprising, in combination with a peeler having an axially inclined cylindrical steam pressure chamber with a rotative conveyor mounted coaxially therein and having power drive means operatively connected to rotate said conveyor about its axis; a backing element mounted in the low end of the steam chamber and having a discharge opening below a maximum desired sludge and condensate level therein, and a sealing plate rotatably mounted coaxially with the conveyor to overlie and seat on the backing element normally to seal said discharge opening, said sealing plate having a passage opening from the interior of the steam chamber at a point adjacent the marginal edge of the sealing plate into the discharge opening in a predetermined rotative position of the rotor plate, thereby to blow sludge and condensate from the steam chamber upon each rotation of the rotor plate.

5. A sludge and condensate remover for a steam peeler comprising, in combination with a peeler having an axially inclined cylindrical steam chamber with a rotative conveyor mounted coaxially therein and having power drive means operatively connected to rotate said conveyor about its axis; a backing plate removably mounted in the low end of the steam chamber and having a discharge opening below a maximum desired sludge and condensate level therein, and a sealing plate rotatably mounted coaxially with the conveyor to overlie and seat on the backing plate normally to seal said discharge opening, said sealing plate having a radial groove in the face thereof seating on the backing plate to form a passage opening from the steam chamber at the marginal edge of the sealing plate into the discharge opening in a predetermined rotative position of the rotor plate, thereby to blow sludge and condensate from the steam chamber upon each rotation of the rotor plate.

6. In a steam peeler having a steam pressure chamber with a sludge outlet in a low portion thereof, a pressure sealing element mounted for normally free rotative and angular tilting adjusting movement inwardly over said sludge outlet, said pressure sealing element having a passage therethrough adapted to communicate between the interior of the steam chamber and the sludge outlet in a predetermined rotative position of the sealing element, and rotative drive means operatively connected to rotate said sealing element without restricting substantially its freedom for angular tilting adjusting movement.

7. In a steam peeler having an axially inclined cylindrical steam pressure chamber with a sludge outlet in a low portion thereof, a rotative shaft journaled axially of said chamber, a pressure sealing element loosely mounted on said shaft for normally free rotative and angular adjusting movement thereon inwardly over said sludge outlet, an abutment on an inner face of said pivotally mounted element, a radially projecting element secured to said shaft and positioned to have abutting driving relation with said abutment, said pressure sealing element having a passage therethrough adapted to communicate openly between the interior of the steam chamber and the sludge outlet in a predetermined rotative position of the sealing element, and rotative drive means operatively connected to rotate said shaft thereby to rotate said sealing element without restricting substantially its freedom for angular adjusting movement.

8. In a steam peeler having a cylindrical steam pressure chamber with a sludge outlet in a low portion thereof, a rotary conveyor journaled axially of said chamber, a pressure sealing element loosely mounted for normally free angular adjusting movement inwardly, and in sealing relation over, said sludge outlet, and drive means operatively connected to said rotary conveyor and to said sealing element to rotate said rotary conveyor and periodically to move said sealing element relatively to said pressure chamber and out of sealing relation to said sludge outlet without restricting substantially its freedom for angular adjusting movement.

9. A sludge and condensate remover for a steam peeler having an axially inclined cylindrical steam pressure chamber with a power driven rotary conveyor mounted coaxially therein, power drive means operatively connected to rotate said conveyor, and means for introducing articles into and removing them from said steam chamber; said remover comprising a backing plate adapted to be seated removably in a lower end portion of such cylindrical chamber to have a portion thereof located below a maximum desired sludge level in said chamber, said backing plate having two different sized exteriorly discharging openings therein with their outer marginal walls located below such maximum sludge level and substantially equi-distant from the rotative axis of the conveyor, means for closing selectively, one or the other of said openings, a rotative sealing plate mounted loosely coaxially of said power driven rotary element to overlie said openings in the backing plate, and adapted to be forced by steam pressure within the chamber into sealing relation with the backing plate, and means drivingly interconnecting said power driven rotary conveyor to the loosely mounted sealing plate with said sealing plate free for tilting movement relative to the conveyor axis of rotation, said sealing plate having a grouped plurality of holes therein, each of said grouped holes being smaller than the larger of said exteriorly discharging openings in the backing plate, the holes being grouped between radial distances from the rotative axis of the sealing plate to open into the larger of said discharging openings upon each complete rotation of the sealing plate, some of the grouped holes being within, and some being wholly beyond the radial limits of the smaller of said discharge openings.

WILLIAM DE BACK.

REFERENCES CITED

The following references are of record in the file of this patent:

UNITED STATES PATENTS

| Number | Name | Date |
| --- | --- | --- |
| 1,078,420 | Davies | Nov. 11, 1913 |
| 1,163,687 | Purvis | Dec. 14, 1915 |
| 1,735,392 | Hiller | Nov. 12, 1929 |